United States Patent [19]

Suzuki et al.

[11] Patent Number: 4,674,587
[45] Date of Patent: Jun. 23, 1987

[54] CONTROL APPARATUS FOR POWER STEERING SYSTEM

[75] Inventors: Yoshio Suzuki; Hirotetu Sonoda; Hideo Yabe, all of Saitama, Japan

[73] Assignee: Jidosha Kiki Co., Ltd., Tokyo, Japan

[21] Appl. No.: 813,269

[22] Filed: Dec. 24, 1985

[30] Foreign Application Priority Data

Dec. 27, 1984 [JP] Japan .................. 59-274004

[51] Int. Cl.⁴ ........................................... B62D 5/04
[52] U.S. Cl. .................................. 180/142; 180/79.1
[58] Field of Search ............. 180/142, 141, 143, 79.1; 74/388 PS

[56] References Cited

U.S. PATENT DOCUMENTS

| 4,320,812 | 3/1982 | Takaoka et al. | 180/142 |
| 4,509,611 | 4/1985 | Kade et al. | 180/142 |
| 4,538,698 | 9/1985 | Hashimoto et al. | 180/79.1 |

FOREIGN PATENT DOCUMENTS

| 49-102092 | 9/1974 | Japan . |
| 59-114159 | 7/1984 | Japan . |
| 59-136375 | 9/1984 | Japan . |

Primary Examiner—John J. Love
Assistant Examiner—Donn McGiehan
Attorney, Agent, or Firm—Blakely, Sokoloff, Taylor & Zafman

[57] ABSTRACT

A control apparatus for a power steering system has a travel condition data memory, a plurality of vehicle velocity response data memories, a correction data memory, and a driver. Traveling condition data is read out in response to average vehicle velocity data and average steering angle data. Vehicle velocity response data is read out from one of the vehicle velocity response data memories in response to the traveling condition data and instantaneous vehicle velocity data. The vehicle velocity response data is added by the driver to the correction data from the correction data memory. The corrected vehicle velocity response data is used to drive a control valve, thereby obtaining an optimal steering force.

7 Claims, 23 Drawing Figures

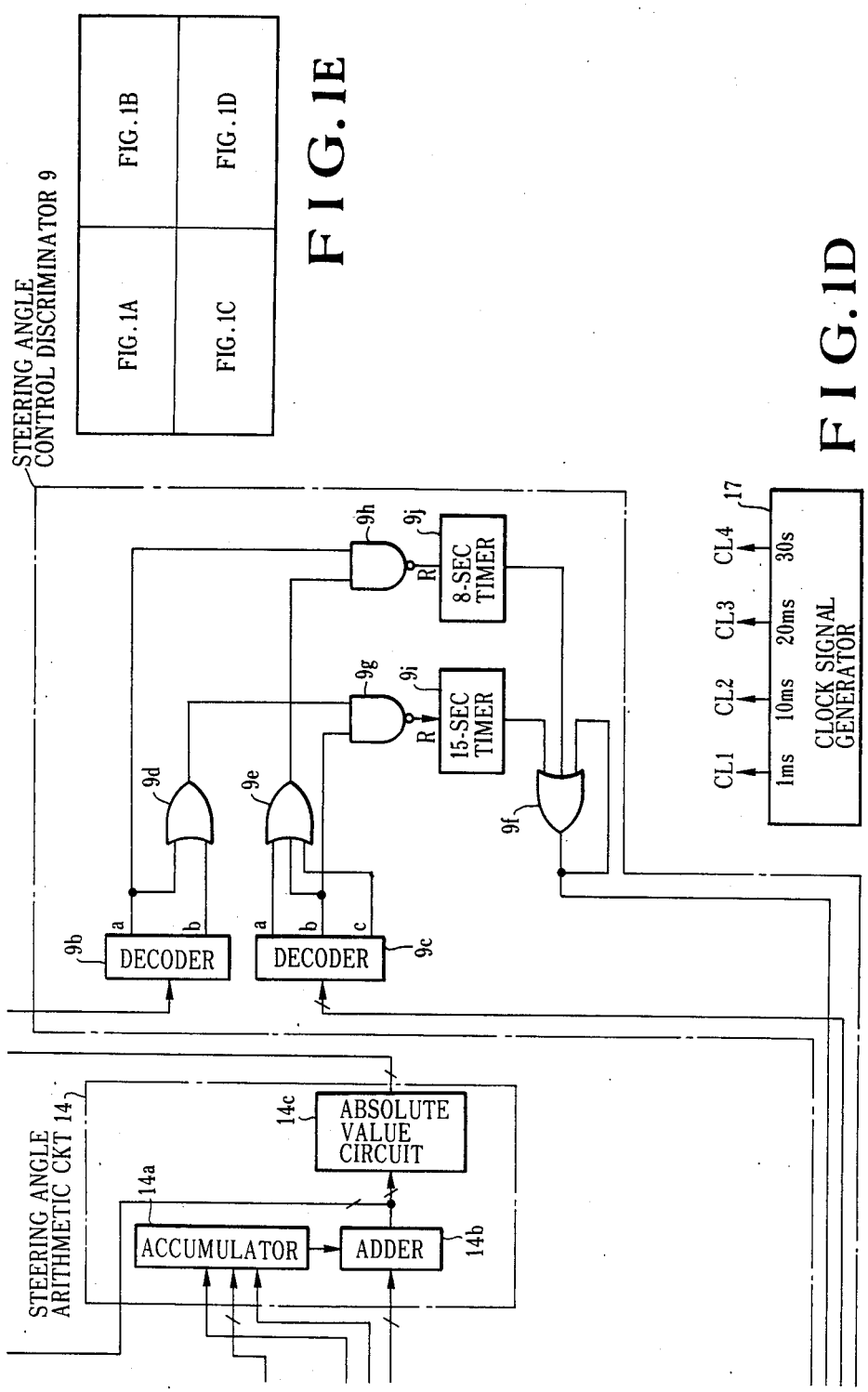

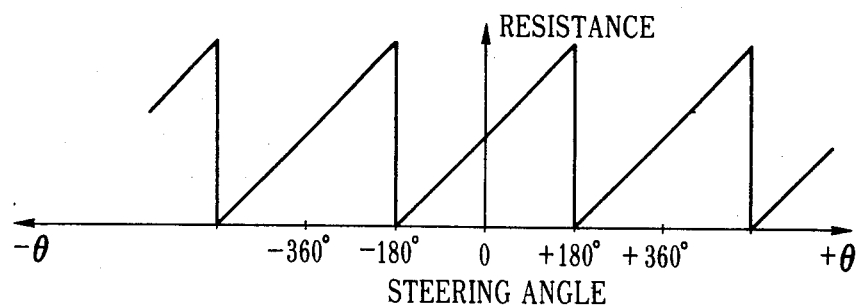
FIG.5
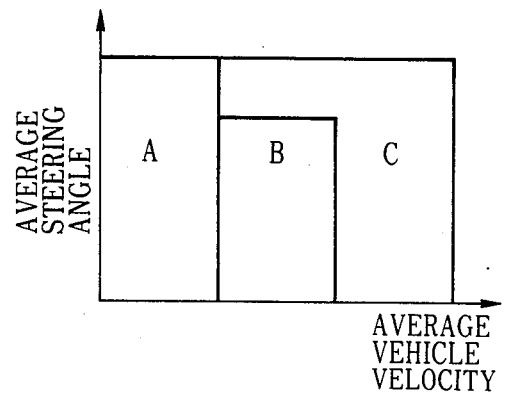
FIG.6
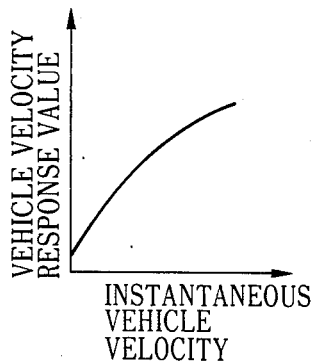 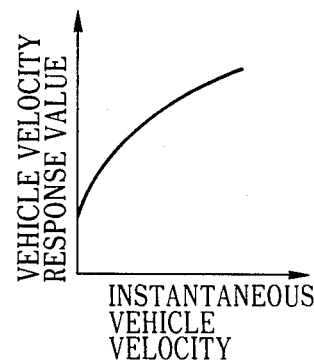 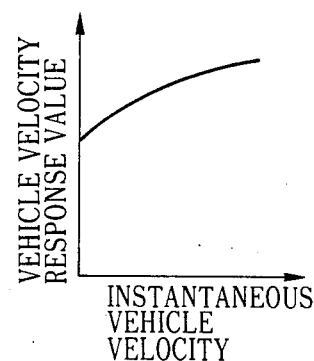
FIG.7A  FIG.7B  FIG.7C

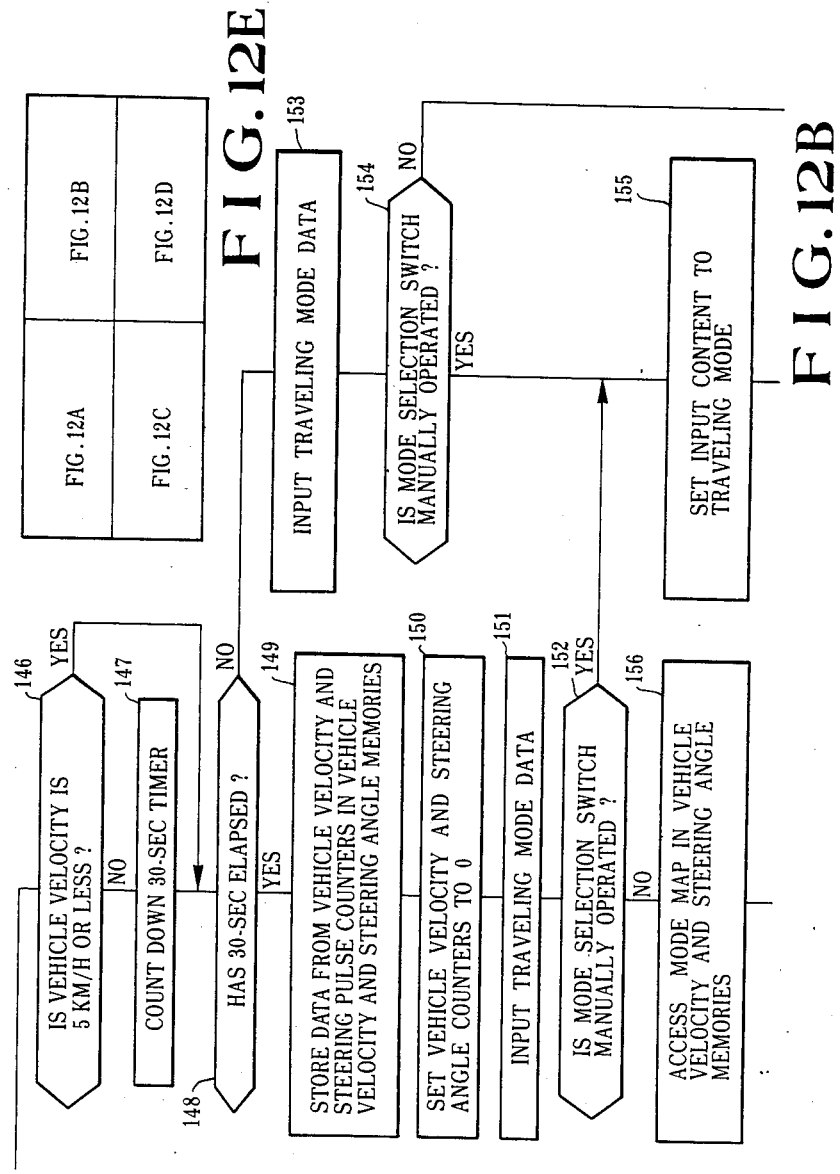

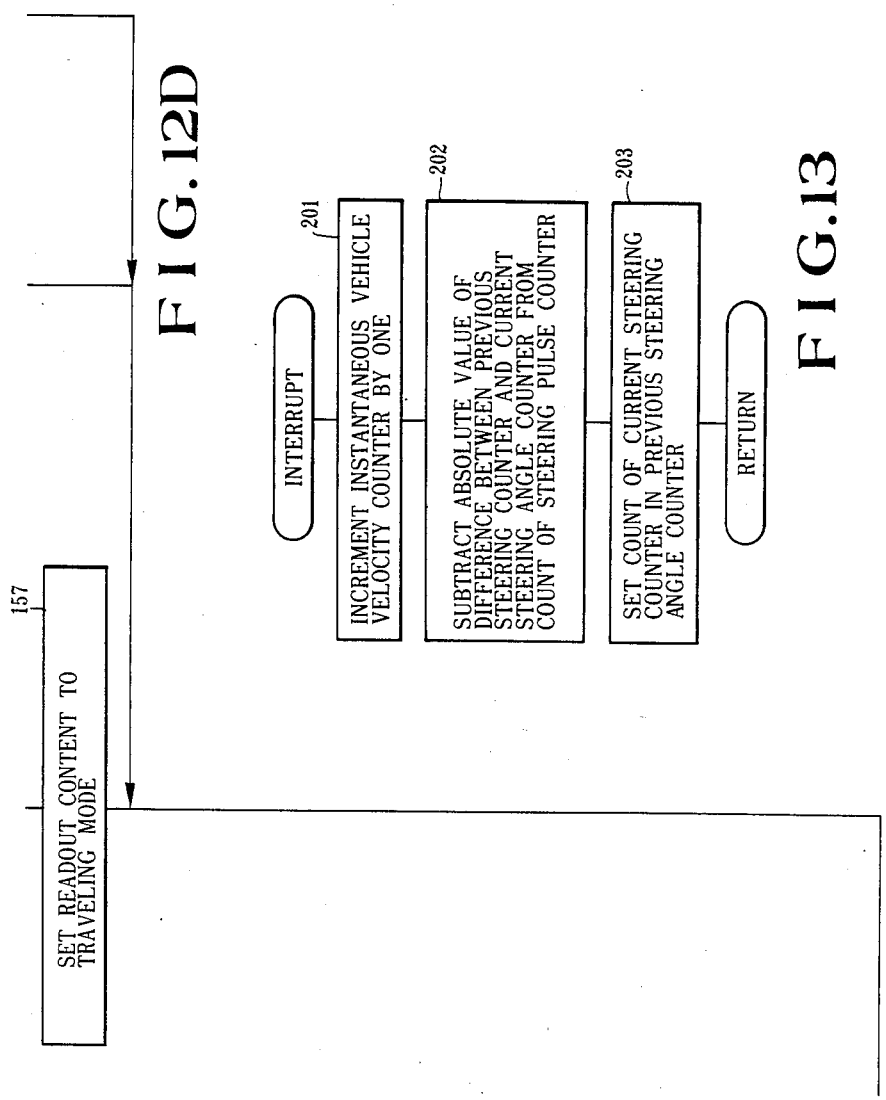

CONTROL APPARATUS FOR POWER STEERING SYSTEM

BACKGROUND OF THE INVENTION

The present invention relates to a control apparatus for a power steering system for producing a proper steering force in accordance with a vehicle velocity and a steering angle.

A steering force of a vehicle is generally increased at a low velocity. In a conventional power steering system for producing auxiliary power in accordance with a current steering force, only a small steering force is required at a low vehicle velocity, but a steering force at a high vehicle velocity is excessively small, thus leading to unstable driving. Various power steering systems have been proposed to decrease a ratio of an auxiliary force input to its output when a vehicle velocity is increased so as to solve the above problem. By using such a power steering system, proper steering forces are required at high and low velocity regions respectively. In other words, a relatively small steering force is required at a low vehicle velocity, and a relatively large steering force is required at a high vehicle velocity.

In general, a steering force is preferably increased when a steering angle is increased. The more the driver turns the steering wheel, the more the steering force preferably increases for safe driving as well as for good steering feelings. This tendency is typical in high-speed driving. However, in a conventional power steering system, an increase in steering force upon turning of the steering wheel is small at a high vehicle velocity. Demand in this respect has arisen for safe driving and good driving feelings. In particular, a driver may overturn the steering wheel due to a small steering force required at a high vehicle velocity, which may lead to a disastrous accident. Therefore, in order to prevent this, in a conventional power steering system, a relatively large steering force is employed throughout the entire velocity range. However, such a large steering force does not guarantee comfortable driving. In particular, long touring at a high speed causes fatigue of the driver.

SUMMARY OF THE INVENTION

It is a principal object of the present invention to provide a control apparatus for a power steering system, wherein a small steering force is required at a low velocity and at the same time a relatively large driving force is required upon increases in vehicle velocity and steering angle to prevent oversteering, thereby improving driving feelings and assuring safe driving.

In order to achieve the above object of the present invention, there is provided a control apparatus for a power steering system comprising: a first pattern memory for storing traveling condition data which is accessed in response to an average vehicle velocity and an average steering angle; selecting means for receiving the traveling condition data and instantaneous vehicle velocity data and selecting first vehicle velocity response data in response to the instantaneous vehicle velocity data so as to control a steering force, the first vehicle velocity response data being adapted to represent a steering force required at a start of steering during straight traveling; and correcting means for correcting the first vehicle velocity response data in response to the instantaneous vehicle velocity data and an absolute value of an actual steering angle.

BRIEF DESCRIPTION OF THE DRAWINGS

FIGS. 1A through 1E are block diagrams of a control apparatus for a power steering system according to an embodiment of the present invention;

FIG. 5 is a graph showing the resistance of the potentiometer of FIG. 4 as a function of the steering angle;

FIG. 6 is a graph showing data allocation in a pattern memory 6;

FIGS. 7A, 7B and 7C are graphs showing vehicle velocity response values as a function of the instantaneous vehicle velocities, respectively;

FIGS. 12A–12E and 13 are flow charts for explaining steps executed by a microcomputer.

DESCRIPTION OF THE PREFERRED EMBODIMENT

Figure 1A:
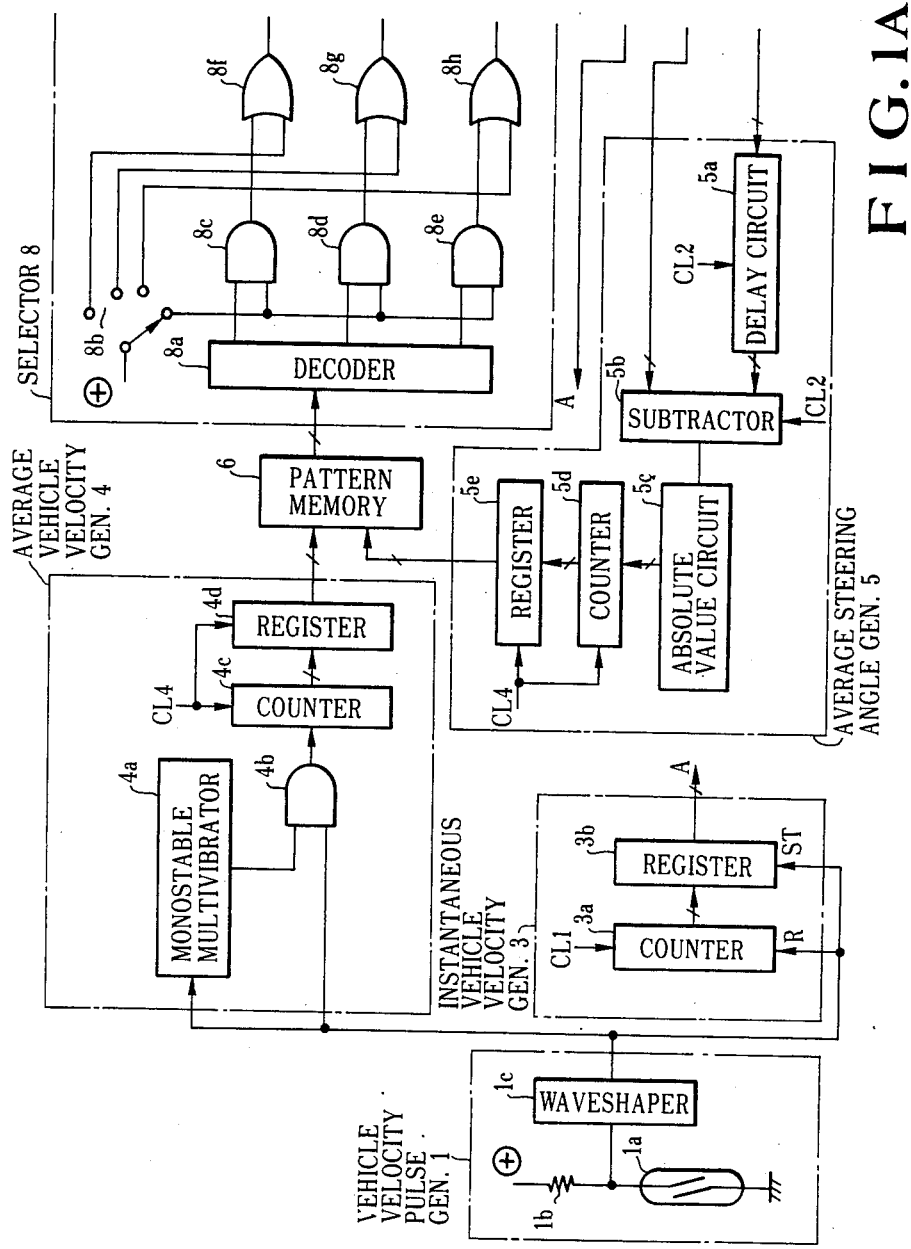
Figure 1B:
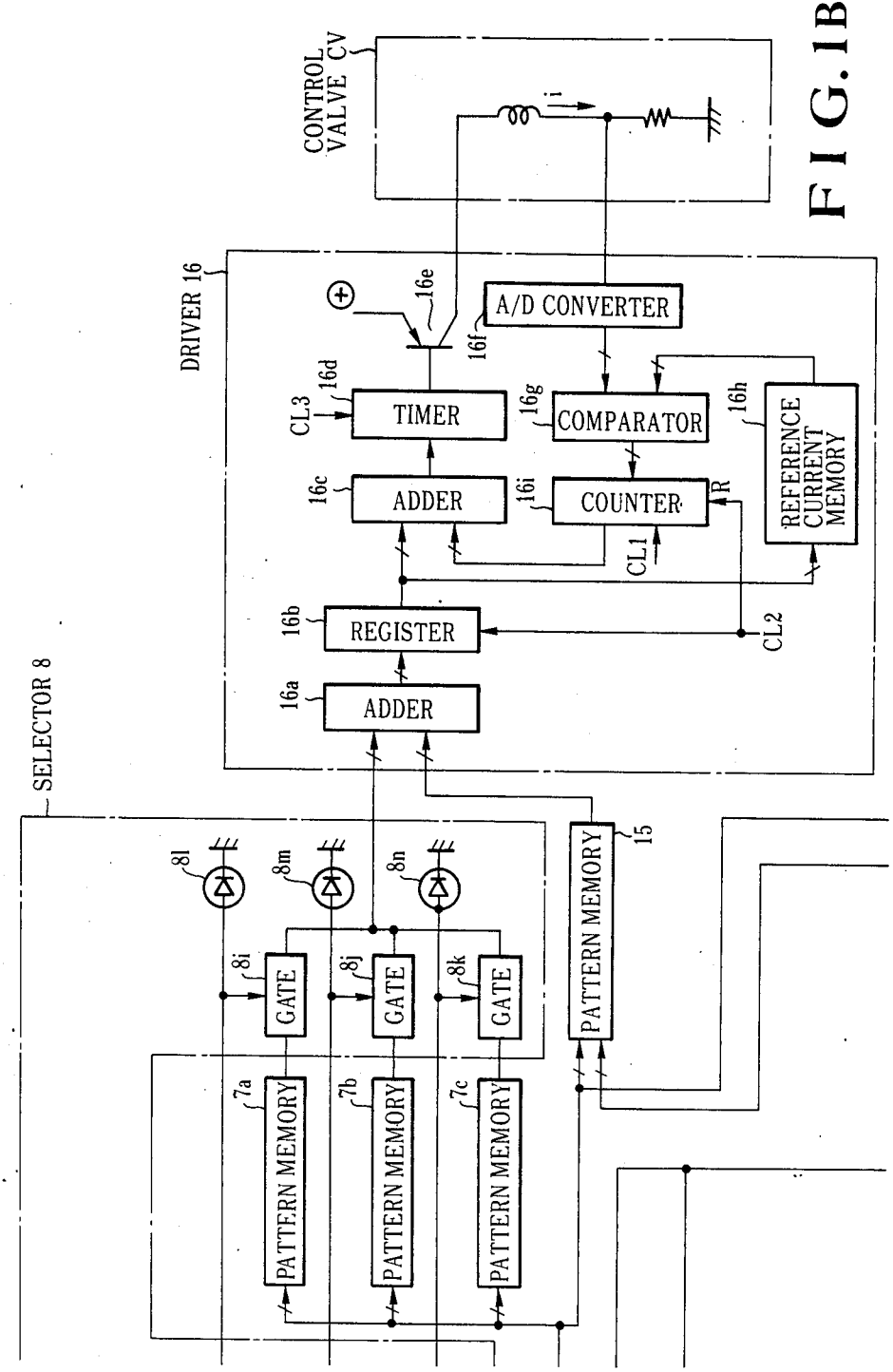
Figure 1C:
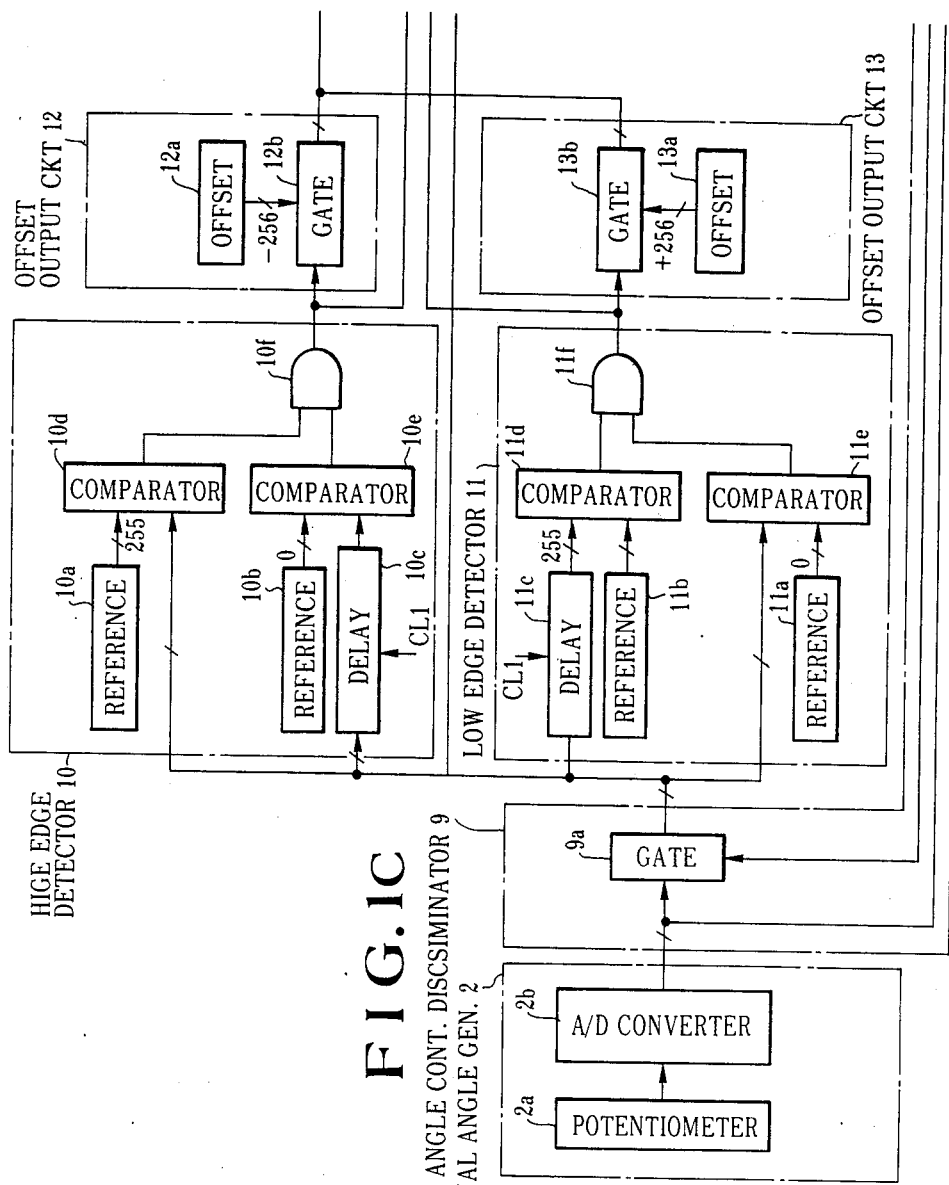
Figure 2:
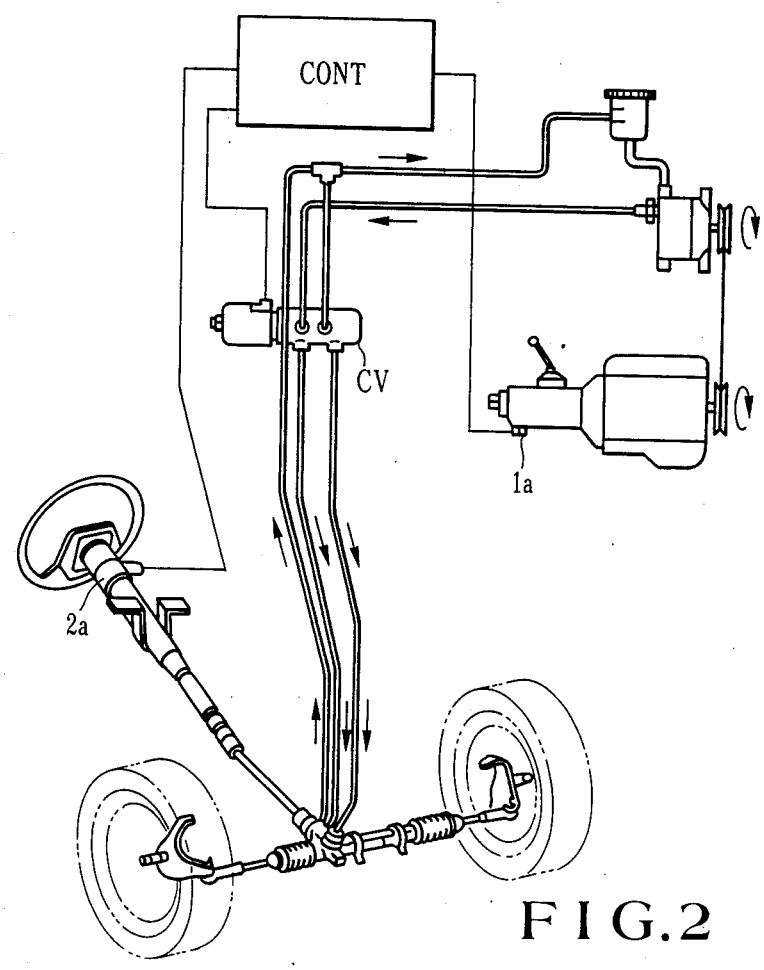
FIG. 2 is a schematic view showing the power steering system employing the control apparatus of FIGS. 1(A–E)

FIGS. 1(A–E) show a control apparatus for a power steering system according to an embodiment of the present invention, and FIG. 2 schematically shows the power steering system employing the control apparatus of FIG. 1. Referring to FIG. 2, reference symbol CONT denotes a control apparatus shown in FIG. 1; and CV, a control valve. Reference numeral 1a denotes a vehicle velocity sensor; and 2a, a steering sensor for generating a steering angle signal. The control apparatus CONT receives a steering angle signal from the steering sensor 2a and a vehicle velocity signal from the vehicle velocity sensor 1a and supplies a current i with a characteristic of FIG. 3 to the control valve CV. The control valve CV controls the magnitude of a steering force in response to the current i supplied thereto. When the current value is increased, the steering force is increased. For this reason, when vehicle velocity is low, the steering force is small and a change in current in response to a change in steering angle is small. Therefore, a change in steering force in response to a change in steering angle is small. However, when the vehicle velocity is increased, a change in steering force in response to a change in steering angle is increased. A steering force at a high vehicle velocity is larger than that at a low vehicle velocity. The steering force is increased significantly when the steering angle is increased, thereby preventing oversteering at a high velocity and allowing a driver to check straight traveling. As a result, easy steering can be performed with confidence.

A process for controlling the characteristics of FIG. 3 in the control apparatus of FIG. 1 will be described hereinafter. Referring to FIG. 1, reference numeral 1 denotes a vehicle velocity pulse generator which has a lead switch 1a which repeats on/off operation upon rotation of a magnet (not shown) together with an output shaft of a reduction gear, a resistor 1b and a waveshaper 1c. The waveshaper 1c generates a short vehicle velocity pulse at an OFF timing of the lead switch 1a. Reference numeral 2 denotes a rotational angle signal generator which has a potentiometer 2a as a steering sensor, and an A/D converter 2b for converting an analog signal from the potentiometer 2a to a digital signal representing one of the values 0 (minimum) to 255 (maximum). In this case, the potentiometer 2a has a main body MB and a slider C, as shown in FIG. 4. The main body MB has a slip ring SL mounted on a steering column SF and a resistor R. The slider C rotates together with the steering shaft SF. Since the slider C is rotated in sliding contact with the slip ring SL and the resistor R, the resistance of the potentiometer 2a is given as one of values from the minimum value to the maximum value upon a change in rotational angle of the steering wheel SW when it is turned by half revolution in the positive or negative direction. An identical resistance change occurs every time the steering wheel WH is rotated once.

Reference numeral 3 denotes an instantaneous vehicle velocity signal generator which has a counter 3a and a register 3b. The counter 3a counts a clock signal CL1 each pulse of which is supplied for every 1 ms. The counter 3a is reset when the vehicle velocity pulse is generated by the vehicle velocity pulse generator 1 and a count of the counter 3a is stored in the register 3b. For this reason, the instantaneous vehicle velocity signal generator 3 generates a larger count when the vehicle velocity is lower. The instantaneous vehicle velocity data is updated every time the vehicle velocity pulse is generated.

Reference numeral 4 denotes an average vehicle velocity signal generator which has a monostable multivibrator 4a, an AND gate 4b, a counter 4c and a register 4d. The monostable multivibrator 4a prevents a vehicle deceleration or stop state caused by a red or stop signal from influencing calculation of an average vehicle velocity. In practice, the monostable multivibrator 4a prevents the counter 4c from counting a vehicle velocity pulse representing a velocity of 5 km/H or less. For example, when four vehicle velocity pulses are generated for every revolution of the axle, an operating period of the monostable multivibrator 4a is selected to be about 282 ms. The vehicle velocity pulses (i.e., the pulses generated at a velocity of 5 km/H or more) generated within this period are supplied to the counter 4c. The period of the pulses generated at a velocity of 5 km or less is longer than 282 ms, so that these pulses are not supplied to the counter 4c. The counter 4c counts the vehicle velocity pulses and receives a clock signal generated for every 30 seconds. After the count is stored in the register 4d, the counter 4c is reset.

Reference numeral 5 denotes an average steering angle signal generator which has a delay circuit 5a for delaying an input signal by 10 ms and generating a delayed signal under the control of a clock signal CL2 generated as a 10-ms clock signal by a clock generator (to be described later), a subtractor 5b for calculating a difference between the input signal and the delayed signal for every 10 ms under the control of the 10-ms clock signal CL2, an absolute value circuit 5c, a counter 5d and a register 5e. The counter 5d and the register 5e generate an average steering angle signal for every 30 seconds in response to a 30-sec clock signal CL4 in the same manner as in the average vehicle velocity signal generator 4.

Reference numeral 6 denotes a pattern memory for storing data representing three types of travel states in modes A to C. This data is read out in response to the average steering angle signal and the average vehicle velocity signal. Mode A in FIG. 6 represents an urban road traveling state wherein an average vehicle velocity is small and an average steering angle is large. Mode B represents a suburban road traveling state, and mode C represents a high way traveling.

Reference numerals 7a, 7b and 7c denote pattern memories for storing vehicle velocity response values (signals for determining power steering angles at start points) for urban road traveling, suburban road traveling and high way traveling, as shown in FIGS. 7A to 7C, respectively.

Reference numeral 8 denotes a selector which has a decoder 8a, a selection switch 8b, AND gates 8c to 8e, OR gates 8f to 8h, gate circuits 8i to 8k, light-emitting diodes 8l to 8n. The decoder 8a decodes the data read out from the pattern memory 6, so that the decoded data represents one of the modes A to C. The selection switch 8b is used to manually select one of the modes A to C or to automatically select it in accordance with the vehicle velocity signal and the steering angle signal.

Reference numeral 9 denotes a steering angle control discriminator which has a gate 9a, decoders 9b and 9c, OR gates 9d, 9e and 9f, NAND gates 9g and 9h, a 15-sec timer 9i, and an 8-sec timer 9j. The decoder 9b generates one of the signals shown in Table 1 in response to the instantaneous vehicle velocity signal. The decoder 9c generates one of the signals shown in Table 2 in response to the rotational angle signal generated by the rotational angle signal generator 2.

TABLE 1

|  | Vehicle Velocity (km/H) | | |
| --- | --- | --- | --- |
|  | 0–19 | 20–50 | 50 or more |
| Output Terminal a | 0 | 0 | 1 |
| Ouput Terminal b | 0 | 1 | 0 |

TABLE 2

|  | Rotational Angle of Steering Wheel | | | | | | | | |
| --- | --- | --- | --- | --- | --- | --- | --- | --- | --- |
|  | −160° | −120° | −50° | −20° | 0° | 20° | 50° | 120° | 160° |
| Output Terminal a | 0 | 0 | 0 | 0 | 0 | 0 | 1 | 1 | 0 |
| Output Terminal b | 0 | 0 | 0 | 1 | 1 | 1 | 0 | 0 | 0 |
| Output Terminal c | 0 | 1 | 1 | 0 | 0 | 0 | 0 | 0 | 0 |

Reference numeral 10 denotes a high edge detector which has reference signal generators 10a and 10b, a delay circuit 10c for delaying an input signal by 1 ms under the control of a clock signal CL1 generated as a 1-ms clock signal by the clock signal generator, comparators 10d and 10e, and an AND gate 10f.

Reference numeral 11 denotes a low edge detector which has reference signal generators 11a and 11b, a delay circuit 11c for delaying an input signal by 1 ms under the control of the 1-ms clock signal CL1, comparators 11d and 11e, and an AND gate 11f.

Reference numerals 12 and 13 denote offset output circuits which have offset signal generators 12a and 13a and gate circuits 12b and 13b, respectively. The offset signal generator 12a generates a signal representing an offset −256, and the offset signal generator 13a generates a signal representing an offset +256.

Reference numeral 14 denotes a steering angle arithmetic circuit which has an accumulator 14a, an adder 14b and an absolute value circuit 14c. The accumulator 14a accumulates an offset signal generated by the offset output circuit 12 or 13 every time the high or low edge detector 10 or 11 generates a detection signal.

Figure 8:
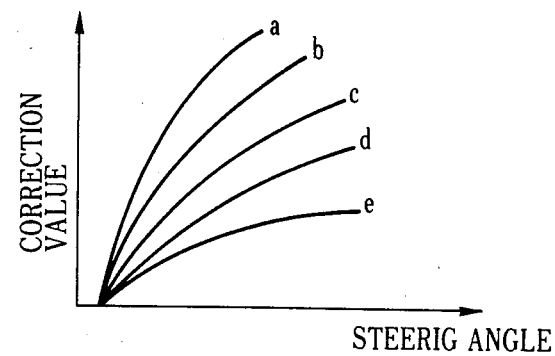
FIG. 8 is a graph showing correction values for the velocity response values as a function of the steering angle.

Reference numeral 15 denotes a pattern memory for storing correction values for correcting the vehicle velocity response values read out from the pattern memories 7a to 7c, as shown in FIG. 8. The correction value is determined by the instantaneous vehicle velocity and the steering angle and is stored by using the steering angle as a variable and the instantaneous vehicle velocity as a parameter. A curve a in FIG. 8 represents a correction characteristic at a maximum vehicle velocity, a curve e represents a correction characteristic at a minimum vehicle velocity, and curves b to d represent correction characteristics at intermediate vehicle velocities.

Reference numeral 16 denotes a driver which has adders 16a and 16c, a register 16b, a timer 16d, a transistor 16e, an A/D converter 16f, a comparator 16g, an up/down counter 16i and a reference power source memory 16h. The timer 16d generates an ON signal corresponding to the output from the adder 16c in response to a clock signal CL3 for every 20 ms. When the output from the adder 16c is disabled, the transistor 16e is kept off.

Reference numeral 17 denotes a clock signal generator for generating four clock signals CL1, CL2, CL3 and CL4 with repetition periods of 1 ms (millisecond), 10 ms, 20 ms and 30 seconds.

Before describing the systematic operation of the control apparatus as a whole, operations and functions of the main circuits will be described hereinafter.

(a) Steering Angle Control Discriminator 9

When a power switch of the control apparatus is turned on, the steering angle control discriminator 9 generates a rotational angle signal corresponding to a rotational angle of a steering wheel. The value represented by the rotational angle signal is identical for each revolution of the steering wheel. The rotational angle signal does not represent a steering direction. With this signal, proper steering control cannot be performed.

The steering angle control discriminator 9 discriminates that the steering wheel is set at an initial angular position within ±180° when the clockwise (right) direction is given by a positive angle and the counterclockwise direction is given by a negative angle without two cases which are unlikely to occur at the beginning of traveling.

The first case which is unlikely to occur in normal operation is that the steering angle is turned clockwise or counterclockwise by a few times plus 150° (i.e., a steering angle of ±210° or more) and this steering state is kept for 8 seconds or more when the vehicle is traveling at a velocity of 50 km/H or more. When the vehicle is traveling at a velocity of 50 km/H or more, the decoder 9b generates an output signal of logic "1" from the output terminal a thereof. In this case, if the steering wheel is turned by 150° or more clockwise or counterclockwise, all output signals from the output terminals a, b and c of the decoder 9c are set at logic "0", as shown in Table 2. For this reason, the NAND gate 9h generates an output signal of logic "1", and then the 8-sec timer 9j is reset. An output from the 8-sec timer 9j is set at logic "0". As long as this state continues, the output from the 8-sec timer 9j is kept low. However, since such a driving state is unlikely to continue from the start of driving, the steering wheel will be returned to an angular position within the ±150°. In this case, one of the output terminals a, b and c of the decoder 9c is set at level "1" in accordance with logic chart of Table 2. Both inputs to the NAND gate 9h are set at logic "1". The reset state of the 8-sec timer 9j is cancelled. When the cancellation state continues for 8 seconds or more, the 8-sec timer 9j generates an output signal of logic "1". When the signal of logic "1" is generated by the 8-sec timer 9j even once, this status signal is stored in the OR gate 9f. In other words, the initial state is acknowledged, and the initial status acknowledge signal is stored. An output signal from the OR gate 9f is supplied to the gate circuit 9a which is then turned on, so that the rotational angle signal is supplied to the next stage and is used to perform steering angle control. The circuit which has received the rotational angle signal performs steering angle control under the assumption that the current steering angle falls within the range of ±150°.

The second case which is unlikely to occur in normal operation is that the steering wheel is turned clockwise or counterclockwise by a few revolutions plus 30° or more (i.e., the steering angle is more than ±330° to 390°), and this steering state is kept for 15 seconds or more when the vehicle is traveling at a velocity of 20 km/H or more. When the velocity is 20 km/H, the OR gate 9d generates an output signal of logic "1". When the steering angle of the steering wheel falls within ±30°, an output signal of logic "1" is generated by the decoder 9c at its output terminal b, and thus the NAND gate 9g generates an output signal of logic "1". When this state continues for 15 seconds or more, the 15-sec timer 9i generates an output signal of logic "1" which is then stored in the OR gate 9f. In this manner, the initial status acknowledge signal is stored in the OR gate 9f.

When either the first case or the second case is acknowledged, the steering angle of the steering wheel falls within ±180 under the assumption that a steering angle corresponding to straight traveling of the vehicle is given as 0°. Therefore, the rotational angle signal from the rotational angle signal generator 2 is processed as described above to achieve normal control.

(b) Low Edge Detector 11, Offset Output Circuit 13 & Steering Angle Arithmetic Circuit 14

Figure 9:
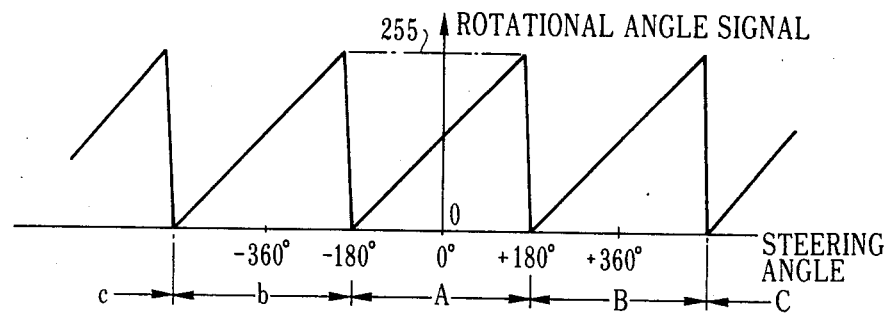
FIG. 9 is a graph showing the rotational angle signal as a function of the steering angle so as to explain an offset value.

As described above, when the initial status is acknowledged, the rotational angle signal is processed under the assumption that the angle of the steering wheel falls within ±180°. In practice, tne rotational angle signal generator 2 generates the rotational angle signal as a digital signal representing one of decimal numbers 0 to 255. As shown in FIG. 9, an angle of ±180° corresponds to a digital signal representing decimal number 255. When the steering wheel is slightly turned clockwise, the rotational angle signal generator 2 generates a digital signal representing decimal number 0. Decimal number 0 is obtained by adding 1 to 255 and can be represented by decimal number 256. In order to update the digital signal representing 255 to that representing 0, an offset signal 256 is added to the output signal generated by the rotational angle signal generator 2. By this manipulation, decimal number 0 represented by the digital signal generated upon turning of the steering wheel over +180° clockwise can be distinguished from that upon turning of the steering wheel over −180° counterclockwise although their decimal values are identical. Similarly, when the steering wheel is turned clockwise and the rotational angle signal represents decimal number 0 again, 256 is added to the current decimal value. In other words, 512 is added to the initial value.

Figure 10:
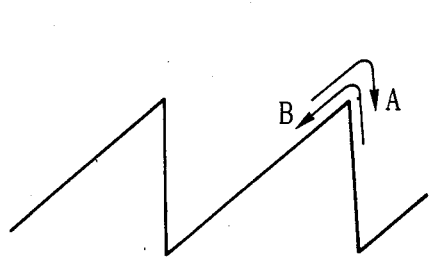
FIG. 10 is a graph for explaining high and low edges.

As indicated by arrow A in FIG. 10, a minimum edge immediately after a maximum value of the rotational angle signal is defined as a low edge, and the low edge detector 11 detects the low edge. The rotational angle signal is delayed by the delay circuit 11c by 1 ms as the repetition period of the clock signal CL1. The comparator 11d compares the 1-ms delayed signal with the signal 255 so as to check their coincidence. When the steering wheel is turned clockwise and its steering angle exceeds +180°, input signals to the comparator 11d have the identical levels, so that the comparator 11d generates a signal of logic "1". Since the steering angle exceeds 180°, the steering angle signal represents value 0, so that the comparator 11e generates a signal of logic "1". Therefore, the AND gate 11f generates a signal of logic "1" as a low edge signal.

Upon generation of the low edge detection signal, the circuit 13b is turned on, so that the offset signal 255 from the offset signal generator 13a is gated to the accumulator 14a. This offset signal is then stored in the accumulator 14a. The signal stored in the accumulator 14a is added to the rotational angle signal from the gate circuit 9a, thereby producing a steering angle signal representing the current steering angle. When the steering wheel is further turned, a low edge signal is generated and is added to the offset signal 256. Therefore, the steering angle represents a value obtained by adding 512 to the rotational angle signal.

(c) High Edge Detector 10 & Offset Output Circuit 12

When the steering wheel is returned counterclockwise after it is turned clockwise over 180°, the rotational angle signal is gradually decreased, reaches 0 and then 255, as indicated by arrow B of FIG. 10. An edge corresponding to a maximum value of the rotational angle signal immediately succeeding a minimum value is defined as a high edge. This high edge is detected by a high edge detector 10. When the 1-ms preceding digital signal represents 0 and the current digital signal represents 255, the AND gate 10f generates a high edge signal of logic "1". When the high edge signal is generated, the offset output circuit 12 generates an offset signal −256. The accumulator 14a subtracts 256 from the currently accumulated value.

The high edge detector 10, the low edge detector 11, the offset output circuits 12 and 13, and the steering angle arithmetic circuit 14 calculate the current steering angle such that the offset signal ±256 is added to the rotational angle signal which varies between 0 and 255.

(d) Instantaneous Vehicle Velocity Signal Generator 3, Average Vehicle Velocity Signal Generator 4 & Average Steering Angle Signal Generator 5

These circuits define each vehicle velocity pulse width as an instantaneous vehicle velocity, and a total vehicle velocity pulse number per 30 seconds and a total steering angle per 30 seconds as the average vehicle velocity and the average steering angle, respectively.

(e) Pattern Memory 6, Pattern Memories 7a to 7c, & Selector 8

In general, the steering force is large at a low velocity but is small at a high velocity. For this reason, in a power steering system, auxiliary power is increased at a low velocity, but is decreased at a high velocity, thereby obtaining substantially a predetermined steering force irrespective of vehicle velocities. However, when a driver drives along urban roads, i.e., crowded places, the steering force is preferably small to decrease driver's fatigue even at a low velocity. However, when the driver drives along a high way, repeated steering is not required even at the same low velocity as in the crowded places. For high-way driving, a small steering force (large auxiliary power) is uneconomical. In this manner, it is more economical to determine power steering characteristics in accordance with the traveling conditions even if the vehicles travel at an identical velocity. The traveling conditions vary in accordance with possible combinations of vehicle velocities and steering angles. However, in practice, three types of traveling conditions are prepared, as shown in FIG. 7. In a driving test, it is proved that no practical problem occurs when one of the traveling conditions is selected in accordance with a combination of the average velocity and the average steering angle. In accordance with the above test results, the pattern memory stores data representing which one of the characteristics corresponds to a current combination of the average steering angle and the average vehicle velocity. The pattern memories 7a to 7c store the characteristics given in FIGS. 7A to 7C, respectively. The selector 8 selects one of the pattern memories 7a to 7c in accordance with the data read out from the pattern memory 6 and decoded by the decoder 8a. However, when the driver manually operates the selection switch 8b to select an input position for the OR gates 8f to 8h, manual selection has a priority over automatic selection.

(f) Pattern Memory 15

The data written in the pattern memories 7a to 7c represents a steering force required at the start of steering from straight driving. The steering force must be corrected in accordance with the instantaneous vehicle velocity and the steering angle, as shown in FIG. 8. For this purpose, the pattern memory 15 stores correction data.

(g) Driver

Data read out from one of the pattern memories 7a to 7c is added to the correction data read out from the pattern memory 15. The control valve CV is then driven in response to the corrected data to obtain a desired steering force. A current flowing through the coil in the control valve is not always constant. The current flowing through the control valve is compared with a reference value read out from the reference power source memory 16h, and a current flowing through a solenoid valve in the control valve CV is corrected by the up/down counter 16i. Therefore, a stable current can flow through the control valve CV.

The above description is concerned with the operations and functions of the main circuits in the control apparatus. The overall operation of the control apparatus will be described hereinafter. When the power switch is turned on, the steering angle control discriminator 9 determines whether or not steering control is performed. When one of the above-mentioned initial cases is acknowledged, the rotational angle signal from the rotational angle signal generator 2 is supplied to the steering angle arithmetic circuit 14. The offset signal is added to the rotational angle signal in accordance with the angular position of the steering wheel. The offset signal represents 0 for range A, 256 for range B, 512 for range C, −256 for range b, and −512 for range c.

When the steering angle is calculated, an average steering angle is calculated in accordance with the calculated steering angle. An average vehicle velocity is calculated in accordance with the detected vehicle velocity signal. A signal representing a current traveling state is read out from the pattern memory 6 in response to the average steering angle and the average vehicle velocity. The selector 8 selects one of the pattern memories 7a to 7c in response to the signal read out from the pattern memory 6, so that the vehicle velocity response value is read out from the selected one of the pattern memories 7a to 7c.

Figure 11:
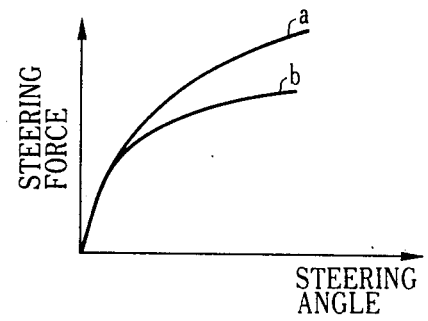
FIG. 11 is a graph showing the steering force as a function of the steering angle.

A correction signal is read out from the pattern memory 15 in response to an absolute value signal of the steering angle and the instantaneous vehicle velocity signal so as to correct the vehicle velocity response value. The correction value is added by the driver 16 to the vehicle velocity response value, and the control valve CV is thus controlled in response to the sum signal from the driver 16. As a result, the characteristics represented by curve a in FIG. 11 can be obtained. Curve b in FIG. 11 represents only vehicle velocity response control.

Figure 3:
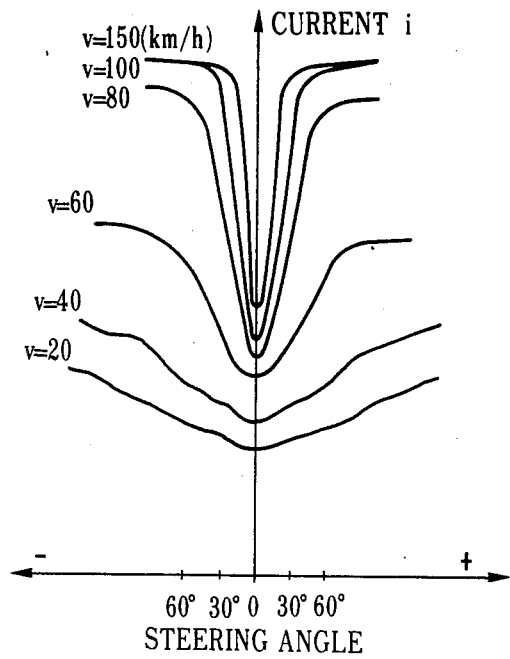
FIG. 3 is a graph showing the output current as a function of the steering angle in the control apparatus of FIGS. 1(A–E)
Figure 4:
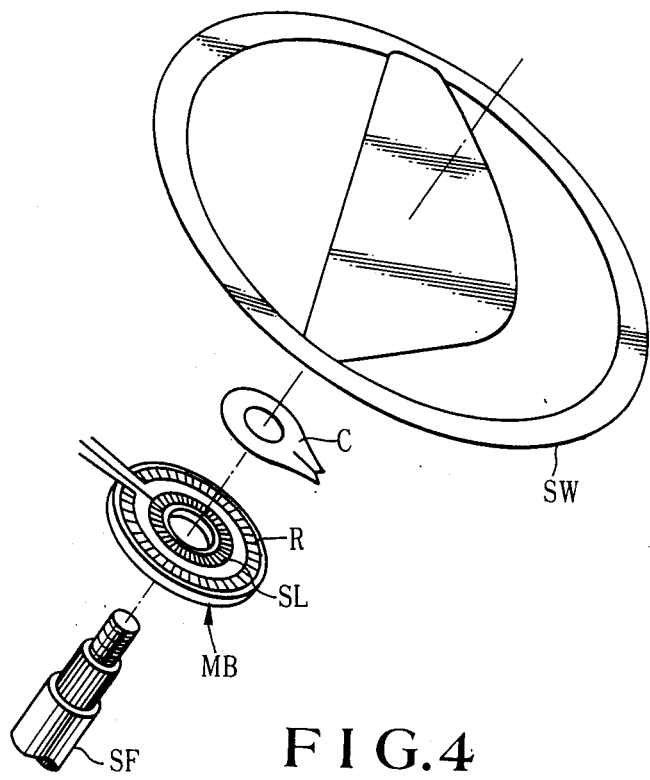
FIG. 4 is an exploded perspective view showing a state wherein a potentiometer is mounted on a steering wheel.

As shown in FIG. 3, a current flowing through the control valve CV at a steering angle of zero, i.e., at the start of steering is determined in accordance with the vehicle velocity. When steering control is started, the current is corrected to be optimal in accordance with the current steering angle. As a result, as shown in FIG. 3, a small steering force is required for a wide steering angle range at a low velocity, and the small steering force range is decreased in accordance with a gradual increase in vehicle velocity. Even if the driver must abruptly steer the steering wheel, oversteering can be prevented. When the steering wheel is returned to the position corresponding to straight traveling, the straight position can be easily checked by the driver, thereby preventing an excessive return of the steering wheel.

Figure 12A:
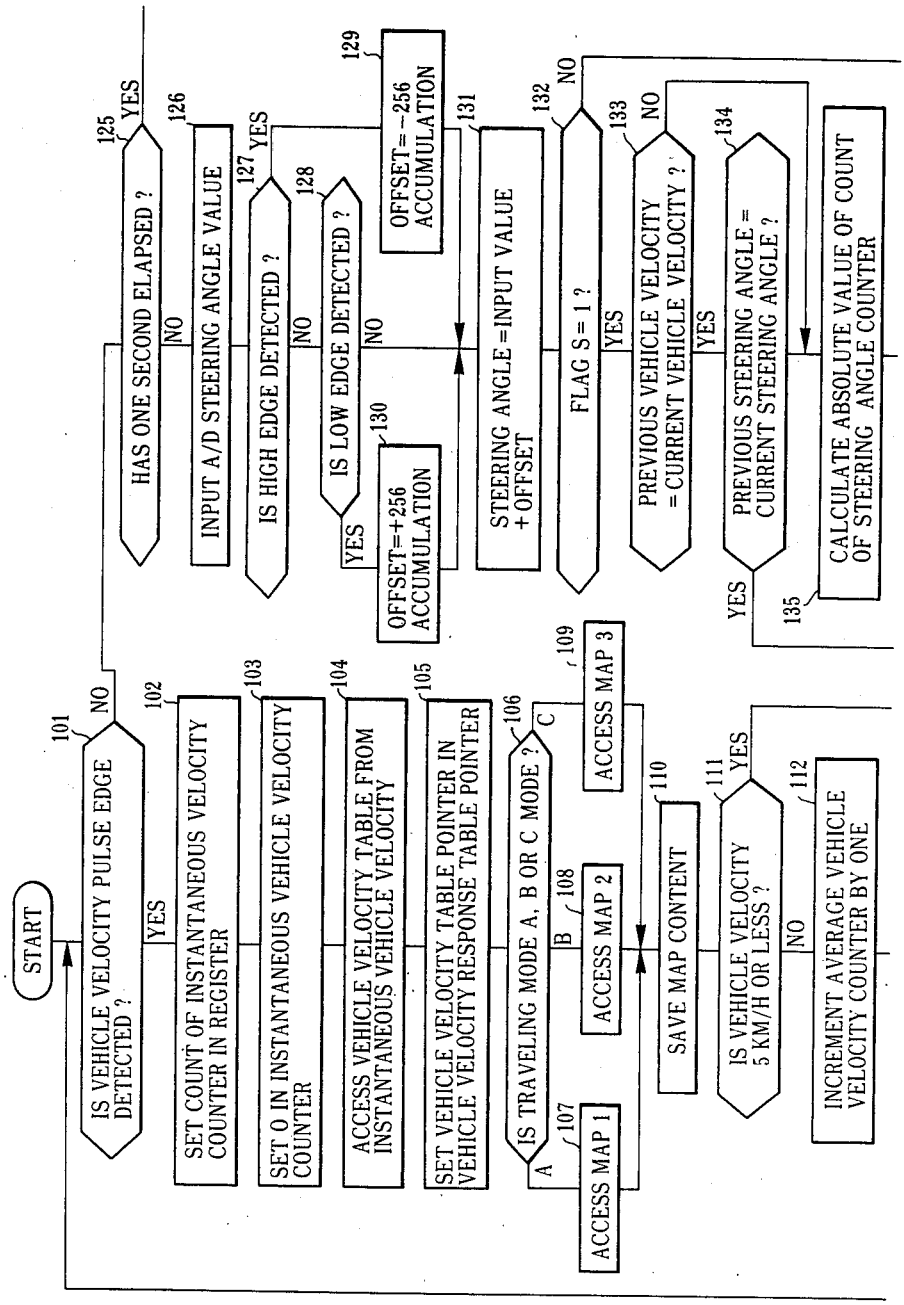
Figure 12C:
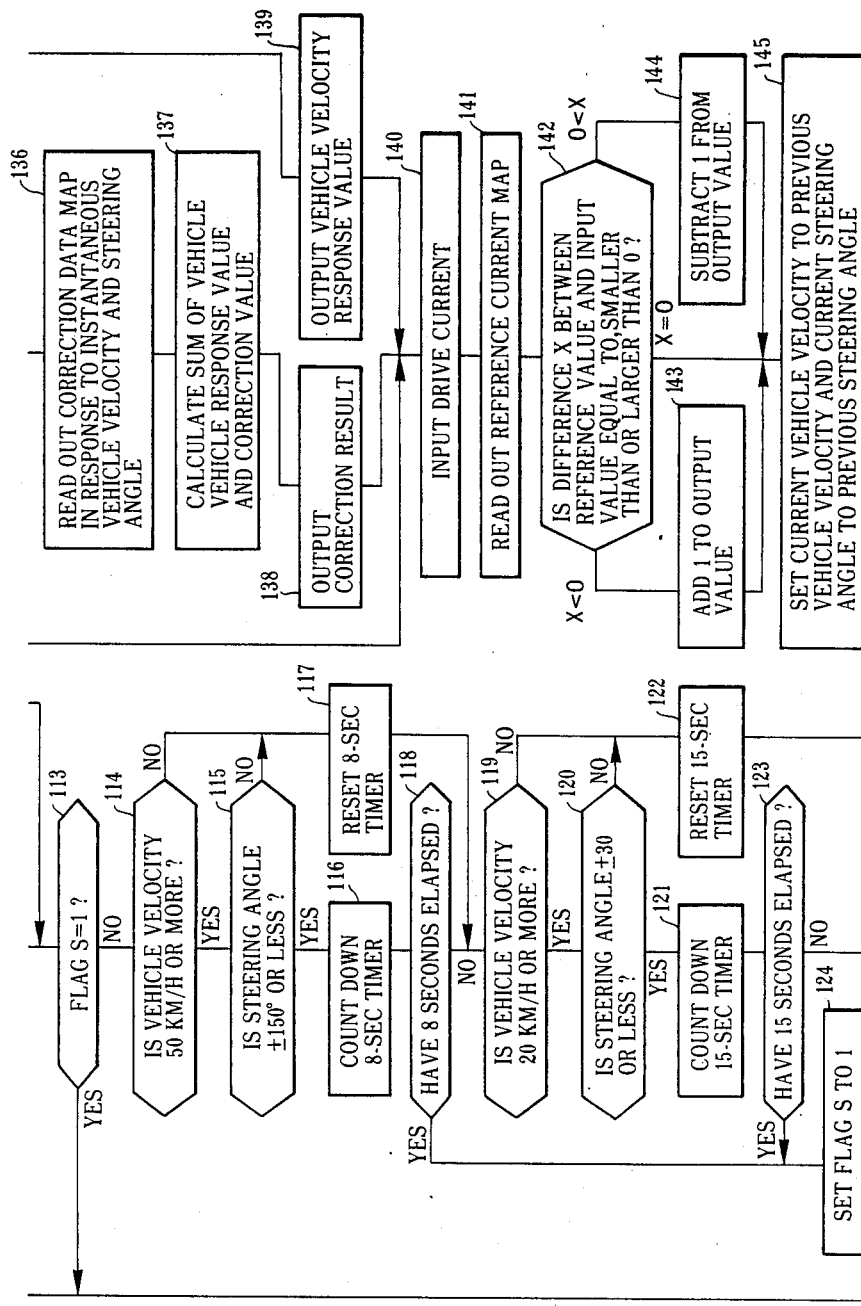

FIGS. 12 and 13 are flow charts for explaining the steps for actuating the control apparatus under the control of a microcomputer. The steps in FIGS. 12 and 13 correspond to the functional blocks of the control apparatus in Table 3 below.

TABLE 3

| Step | Corresponding Block |
|---|---|
| 101 | Vehicle velocity pulse generator 1 |
| 102, 103, 201 | Instantaneous vehicle velocity signal generator 3 |
| 104–110 | Pattern memories 7a, 7b and 7c and gate circuits 8i, 8j and 8k |
| 111 | Monostable multivibrator 4a and AND gate 4b |
| 112 | Counter 4c |
| 113 | OR gate 9f |
| 114–124 | Steering angle control discriminator 9 (excluding OR gate 9f and gate 9a) |
| 126 | Rotational angle signal generator 2 |
| 127, 129 | High edge detector 10, offset output circuit 12 and accumulator 14a |
| 128, 130 | Low edge detector 11, offset output circuit |

TABLE 3-continued

| Step | Corresponding Block |
|---|---|
|  | 13 and accumulator 14a |
| 131 | Adder 14b |
| 132 | Gate 9a |
| 135, 136 | Pattern memory 15 |
| 137, 138, 139 | Adder 16a, register 16b, adder 16c, timer 16d and transistor 16e |
| 140–144 | A/D converter 16f, comparator 16g, reference current memory 16h and counter 16i |
| 147–150 | Registers 4d and 5e |
| 151–155 | Selector 8 (excluding gate circuits 8i to 8k) |
| 156, 157 | Pattern memory 15 and decoder 8a |
| 202 | Delay circuit 5a, subtracter 5b, absolute value circuit 5c, counter 5d and register 5e |

According to the present invention as described above, the vehicle velocity response value can be corrected by the correction value generated in response to the instantaneous vehicle velocity and the steering angle, so that the small steering force range can be decreased in accordance with an increase in vehicle velocity, thereby providing necessary power steering and preventing oversteering at a high velocity. Furthermore, straight traveling can be easily checked by the driver at a high speed, thus guaranteeing safe and comfortable driving.

What is claimed is:

1. A control apparatus for a power steering system in a vehicle, said system including a steering wheel whose angular displacement controls a steering angle of the vehicle, said apparatus comprising:
   a vehicle velocity detector means for providing an electronic measurement of an instantaneous vehicle velocity;
   a first averaging means electrically connected to the vehicle velocity detector means for providing an electronic measurment of an average vehicle velocity;
   a steering angle detector means for providing an electronic measurement of an actual steering angle of the vehicle and an absolute value thereof;
   a second averaging means electrically connected to the steering angle detector means for providing an electronic measurement of an average steering angle of the vehicle;
   a first pattern memory electrically connected to the first and second averaging means for storing traveling condition data, a set of which is retrieved and presented at an output of the first pattern memory means as a function of the average vehicle velocity and the average steering angle;
   selecting means electrically connected to the output of the first pattern memory means and the vehicle velocity detector means for storing vehicle velocity response data and selecting a set thereof as a function of the retrieved traveling condition data and the isntantaneous vehicle velocity;
   correcting means electrically connected to the vehicle velocity detector means and steering angle detector means for providing correction data as a function of the instantaneous vehicle velocity and the absolute value of the actual steering angle; and
   control means electrically connected to the selecting means and the correcting means for controlling a steering force as a function of the selected vehicle velocity response data and the correction data;

whereby a small steering force is required at low vehicle velocities and small steering angles and relatively greater steering force is required at higher vehicle velocities and larger steering angles.

2. The apparatus of claim 1 wherein the selecting means comprises:
   a mode selection switch having at least two positions;
   a decoder electrically connected to the output of the first pattern memory means for decoding the retrieved traveling condition data;
   a plurality of second pattern memory means, for storing vehicle velocity response data; and
   a plurality of gate circuits electrically connected to the second pattern memory means, the decoder and the mode selection switch for selectively gating a set of vehicle response data as a function of the decoded traveling condition data and the position of the mode selection switch.

3. The apparatus of claim 1 wherein the correcting means comprises a third pattern memory means for storing correction data, a set of which is retrieved as a function of the instantaneous vehicle velocity and the absolute value of the actual steering angle.

4. The apparatus of claim 1 wherein the control means comprises:
   a control valve for producing a steering force in response to an electrical current;
   a comparator electrically connected to the control valve for comparing the electrical current therewithin with a reference current and providing an electronic measurement of the difference between the control valve current and the reference current;
   an up/down counter electrically connected to the comparator for providing a correction count as a function of the measured current difference;
   a first adder electrically connected to the selecting means and the correcting means for adding the selected velocity response data and the correction data;
   a second adder electrically connected to the first adder and the up/down counter for adding the output of the first adder and the correction count; and
   means electrically connected to the second adder and the control valve for converting the output of the second adder into the electrical current provided to the control valve.

5. The apparatus of claim 1 wherein the steering angle detector means comprises a steering angle control discriminator electrically connected to the vehicle velocity detector means and connected to means for sensing an angular position of the steering wheel and generating a discriminated rotational angle signal as a function of the instantaneous vehicle velocity and the angular position of the steering wheel, whereby ambiguities in the measured steering angle of the vehicle as a result of multiple full turns of the steering wheel are eliminated.

6. The apparatus of claim 5 wherein the steering angle detector means further comprises:
   a low edge detector electrically connected to the steering angle control discriminator for generating a low edge signal corresponding to a transition from a maximum value to a minimum value of the discriminated rotational angle signal;
   an offset output circuit electrically connected to the low edge detector for providing offset data in response to the low edge signal; and
   a steering angle arithmetic circuit electrically connected to the steering angle control discriminator, the low edge detector and the offset output circuit for combining the discriminated rotational angle signal, the low edge signal and the offset data to generate an absolute value of the actual steering angle.

7. The apparatus of claim 5 wherein the steering angle detector means further comprises:
   a high edge detector electrically connected to the steering angle control discriminator for generating a high edge signal corresponding to a transition from a minimum value to a maximum value of the discriminated rotational angle signal;
   an offset output circuit electrically connected to the high edge detector for providing offset data in response to the high edge signal; and
   a steering angle arithmetic circuit electrically connected to the steering angle control discriminator, the high edge detector and the offset output circuit for combining the discriminated rotational angle signal, the high edge signal and the offset data to generate an absolute value of the actual steering angle.

* * * * *

UNITED STATES PATENT AND TRADEMARK OFFICE
CERTIFICATE OF CORRECTION

PATENT NO. : 4,674,587
DATED : 6/23/87
INVENTOR(S) : SUZUKI ET AL.

It is certified that error appears in the above-identified patent and that said Letters Patent is hereby corrected as shown below:

| COLUMN | LINE | DESCRIPTION |
|--------|------|-------------|
| 4 | 46 | delete "a" insert --$a$-- |
| 4 | 48 | delete "b" insert --$b$-- |
| 4 | 56 | delete "a" insert --$a$-- |
| 4 | 59 | delete "b" insert --$b$-- |
| 4 | 62 | delete "c" insert --$c$-- |
| 5 | 25 | delete "a" insert --$a$-- |
| 5 | 27 | delete "e" insert --$e$-- |
| 5 | 28 | delete "b" insert --$b$-- |
| 5 | 28 | delete "d" insert --$d$-- |
| 6 | 3 | delete "a" insert --$a$-- |
| 6 | 6 | delete "a" insert --$a$-- |
| 6 | 6 | delete "b" insert --$b$-- |

UNITED STATES PATENT AND TRADEMARK OFFICE
CERTIFICATE OF CORRECTION

PATENT NO. : 4,674,587
DATED : 6/23/87
INVENTOR(S) : SUZUKI ET AL.

It is certified that error appears in the above-identified patent and that said Letters Patent is hereby corrected as shown below:

| COLUMN | LINE | DESCRIPTION |
|--------|------|-------------|
| 6 | 6  | delete "c" insert --$\underline{c}$-- |
| 6 | 15 | delete "a" insert --$\underline{a}$-- |
| 6 | 15 | delete "b" insert --$\underline{b}$-- |
| 6 | 15 | delete "c" insert --$\underline{c}$-- |
| 6 | 43 | delete "b" insert --$\underline{b}$-- |
| 6 | 61 | delete "tne" insert --the-- |
| 9 | 31 | delete "a" insert --$\underline{a}$-- |
| 9 | 32 | delete "b" insert --$\underline{b}$-- |

Signed and Sealed this

Ninth Day of August, 1988

Attest:

DONALD J. QUIGG

Attesting Officer

Commissioner of Patents and Trademarks